(12) United States Patent
Oziomek et al.

US006423781B1

(10) Patent No.: US 6,423,781 B1
(45) Date of Patent: Jul. 23, 2002

(54) ELASTOMERS HAVING A REDUCED HYSTERESIS VIA INTERACTION OF POLYMER WITH SILICA SURFACES

(75) Inventors: James Oziomek, Cuyahoga Falls; William L. Hergenrother, Akron, both of OH (US)

(73) Assignee: Bridgestone Corporation, Tokyo (JP)

( * ) Notice: Subject to any disclaimer, the term of this patent is extended or adjusted under 35 U.S.C. 154(b) by 18 days.

(21) Appl. No.: 09/724,212

(22) Filed: Nov. 28, 2000

Related U.S. Application Data

(62) Division of application No. 08/891,569, filed on Jul. 11, 1997.

(51) Int. Cl.$^7$ .................................................. C08L 7/00
(52) U.S. Cl. ................ 525/236; 525/332.5; 525/332.6; 525/332.7; 525/332.8; 525/332.9; 525/333.1; 525/333.2; 525/342
(58) Field of Search ............................. 525/236, 331.4, 525/332.5, 332.6, 332.7

(56) References Cited

U.S. PATENT DOCUMENTS

| | | | |
|---|---|---|---|
| 3,439,049 A | 4/1969 | Trepka | |
| 3,717,600 A | 2/1973 | Dalhuisen et al. | 260/23 H |
| 4,029,513 A | 6/1977 | Vessey et al. | 106/288 B |
| 4,436,847 A | 3/1984 | Wagner | 523/203 |
| 4,482,657 A | 11/1984 | Fischer et al. | 523/334 |
| 5,227,431 A | 7/1993 | Lawson et al. | 525/237 |
| 5,268,439 A | * 12/1993 | Hergenrother et al. | 152/564 |
| 5,354,822 A | * 10/1994 | Antkowiak et al. | 524/567 |
| 5,393,721 A | * 2/1995 | Kitamura et al. | 502/152 |
| 5,502,131 A | 3/1996 | Antkowiak et al. | 526/180 |
| 5,508,333 A | 4/1996 | Shimizu | 524/424 |
| 5,514,756 A | 5/1996 | Hsu et al. | 525/332.5 |
| 5,521,309 A | 5/1996 | Antkowiak et al. | |
| 5,552,473 A | 9/1996 | Lawson et al. | 524/575 |
| 5,574,109 A | 11/1996 | Lawson et al. | 525/280 |
| 5,610,227 A | * 3/1997 | Antkowiak et al. | 152/450 |
| 5,610,237 A | 3/1997 | Lawson et al. | 525/280 |
| 5,616,655 A | 4/1997 | D'Sidocky et al. | 525/342 |
| 5,798,419 A | 8/1998 | Ruiz Santa Quiteria et al. | 525/370 |
| 5,866,650 A | 2/1999 | Lawson et al. | 524/572 |
| 5,872,171 A | 2/1999 | Detrano | |
| 5,872,176 A | 2/1999 | Hergenrother et al. | 524/494 |
| 5,916,961 A | 6/1999 | Hergenrother et al. | 524/572 |
| 6,008,295 A | 12/1999 | Takeichi et al. | 525/105 |

FOREIGN PATENT DOCUMENTS

| | | | |
|---|---|---|---|
| CA | 2184932 | 3/1997 | |
| CA | 2242310 | 1/1999 | |
| CA | 2242383 | 1/1999 | |
| CA | 2242783 | 1/1999 | |
| CA | 2242797 | 1/1999 | |
| CA | 2242800 | 1/1999 | |
| CA | 2242801 | 1/1999 | |
| CA | 2243091 | 1/1999 | |
| CH | 299373 | 8/1954 | |
| DE | 29 05 977 | 8/1979 | |
| DE | 43 08 311 | 8/1979 | |
| EP | 0316 255 | 5/1988 | ........... C08C/19/44 |
| EP | 0 299 074 | 1/1989 | |
| EP | 0 510 410 | 10/1992 | |
| EP | 0 754 710 | 1/1997 | |
| EP | 0 761 734 | 3/1997 | |
| EP | 0 765 904 | 4/1997 | |
| EP | 0 767 179 | 4/1997 | |
| EP | 0 795 577 | 9/1997 | |
| EP | 0 890 580 | 1/1999 | |
| EP | 0 890 587 | 1/1999 | |
| EP | 0 890 588 | 1/1999 | |
| EP | 0 890 602 | 1/1999 | |
| EP | 0 890 603 | 1/1999 | |
| EP | 0 890 606 | 1/1999 | |
| EP | 0 908 586 | 1/1999 | |
| JP | 63-213536 | 9/1988 | |
| JP | 94106340 | 4/1994 | ............. C08L/9/06 |

OTHER PUBLICATIONS

"Reactions of Organostannanes with Silica, γ–Alumina, and Silica–Alumina" Ballivet–Tkatchenko et al. *Langmuir* vol. 9, No. 12, pp. 3513–3517 Sep. 29, 1997.

"Surface Organoletallic Chemistry of Tin: Reactivity of Tetraalkyltin Complexes and Tributyltin Hydride Toward Silica" Nédez et al. *American Chemical Society*, vol. 115, No. 2, pp. 722–729, 1993.

* cited by examiner

*Primary Examiner*—Bernard Lipman
(74) *Attorney, Agent, or Firm*—Meredith Palmer; Barbara Arndt

(57) ABSTRACT

The reduction of hysteresis in a silica-filled, vulcanized elastomeric compound is produced by mixing diene monomer and optionally monovinyl aromatic monomer with an initiator and a coordinator; effecting polymerization conditions; terminating polymerization with a terminator containing an organo-tin group to form a tin-coupled diene elastomer; compounding the tin-coupled diene elastomer with an amorphous silica filler and a vulcanization agent; and, effecting vulcanization. A pneumatic tire tread stock incorporating the vulcanized elastomer compound exhibits decreased rolling resistance in the tire.

8 Claims, 2 Drawing Sheets

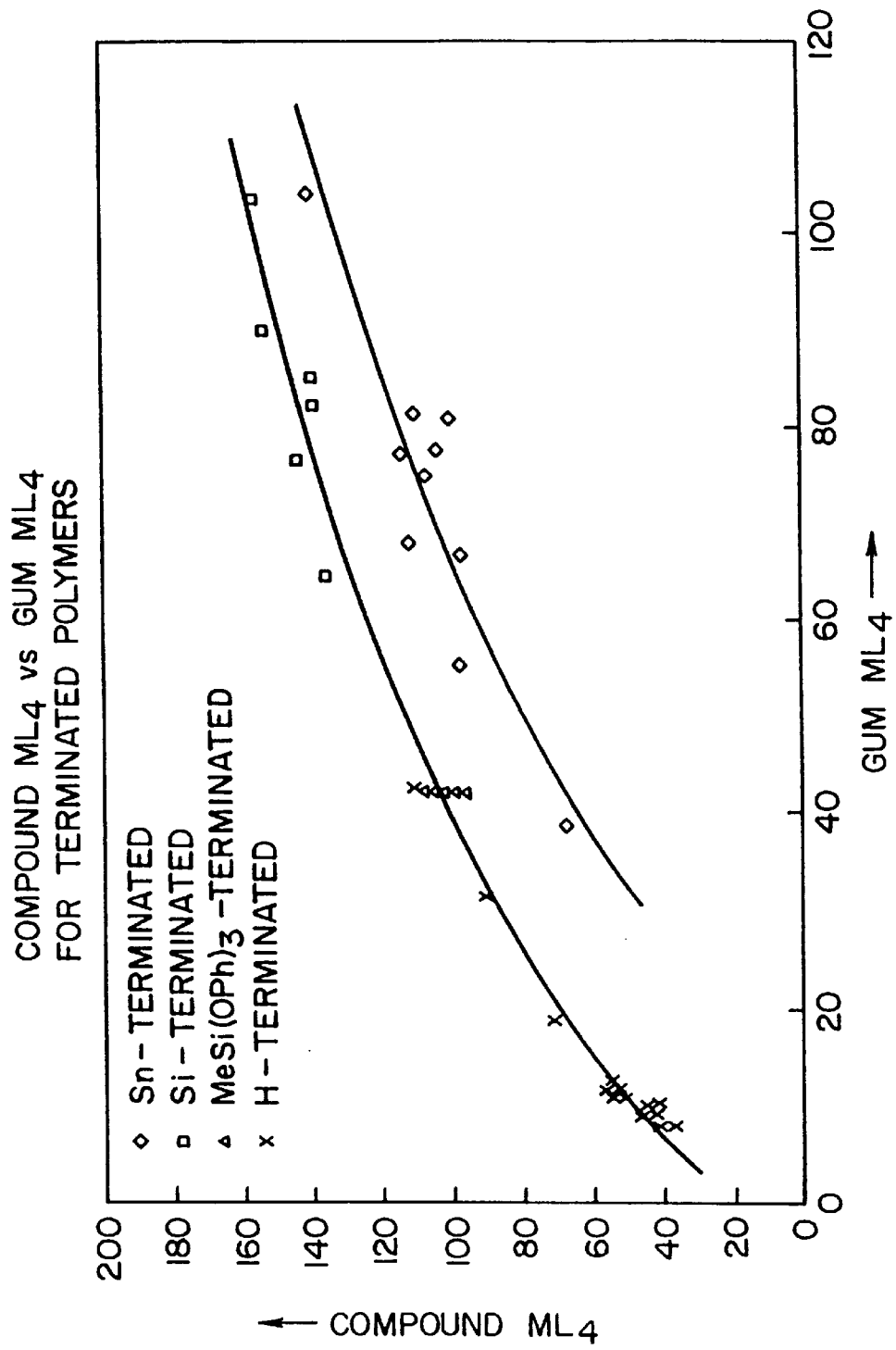

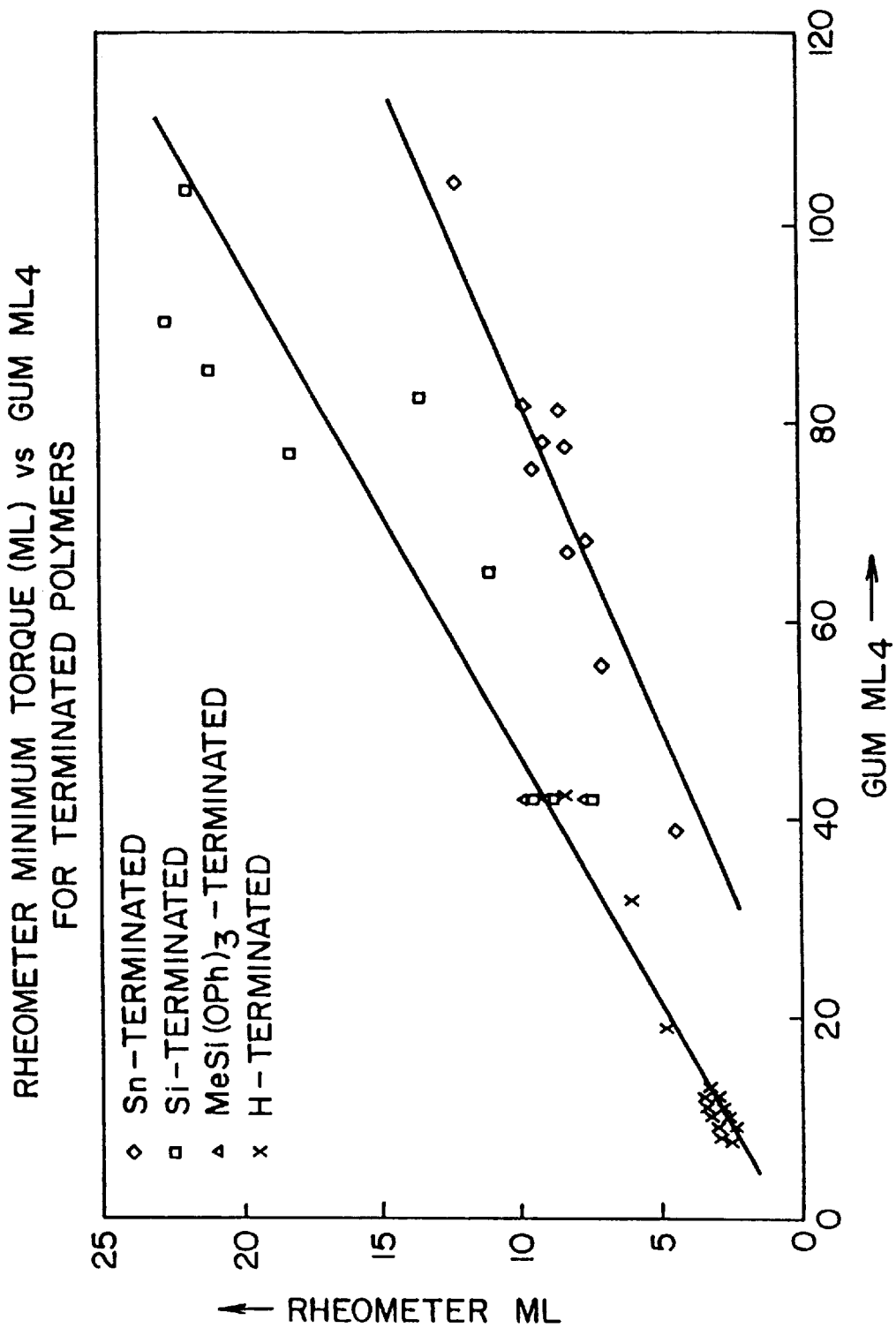

ELASTOMERS HAVING A REDUCED HYSTERESIS VIA INTERACTION OF POLYMER WITH SILICA SURFACES

This application is a division of U.S. application Ser. No. 08/891,569, filed Jul. 11, 1997.

TECHNICAL FIELD

The subject invention relates to the anionic polymerization of diene polymer and copolymer elastomers. More specifically, the present invention relates to anionic polymerization employing an organolithium initiator and a terminator modified with a coupling agent, providing improved interaction with silica fillet surfaces and reducing compound viscosity for better processing.

Silica filled compounds which include diene polymers and copolymers prepared according to the present invention, have reduced hysteresis characteristics. Articles such as tires, power belts and the like which are prepared from these compounds exhibit increased rebound, decreased rolling resistance and less heat build-up during mechanical stress operations.

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

The hysteresis of an elastomeric compound refers to the difference between the energy applied to deform an article made from the elastomeric compound and the energy released as the elastomeric compound returns to its initial, undeformed state. In pneumatic tires, lowered hysteresis properties are associated with reduced rolling resistance and heat build-up during operation of the tire. These properties, in turn, result in such desirable characteristics as lowered fuel consumption of vehicles using such tires.

In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as sulfur-containing vulcanizing (that is, curing) system.

Previous attempts at preparing reduced hysteresis products have focused upon increased interaction between the elastomer and the compounding materials such as carbon black, including high temperature mixing of the filler-rubber mixtures in the presence of selectively-reactive promoters to promote compounding material reinforcement, surface oxidation of the compounding materials, chemical modifications to the terminal end of polymers using tetramethyl-diaminobenzophenone (Michler's ketone), tin coupling agents and the like and, surface grafting.

It has also been recognized that carbon black, employed as a reinforcing filler in rubber compounds, should be well dispersed throughout the rubber in order to improve various physical properties. One example of the recognition is provided in published European Pat. Appln. EP 0 316 255 A2 which discloses a process for end capping polydienes by reacting a metal terminated polydiene with a capping agent such as a halogenated nitrile, a heterocyclic aromatic nitrogen-containing compound or an alkyl benzoate. Additionally, the application discloses that both ends of the polydiene chains can be capped with polar groups by utilizing functionalized initiators, such as lithium amides.

Various organolithium polymerization initiators are also known in the art. U.S. Pat. No. 3,439,049, owned by the Assignee of record, discloses an organolithium initiator prepared from a halophenol in a hydrocarbon medium.

Precipitated silica has been increasingly used as a reinforcing particulate filler in carbon black-filled rubber components of tires and mechanical goods. Silica-loaded rubber stocks, however, exhibit relatively poor resilience, and thus, increased hysteresis.

The present invention provides terminators for anionic polymerization which become incorporated into the polymer chain, providing functional groups which greatly improve the interactions of the polymer with the surface of the silica filler, resulting in the reduction of hysteresis in the vulcanized compound.

It is known that alkoxyalkylsilanes can react with the surface hydroxyl groups of silica particles to liberate alcohol and form an Si—O—Si linkage with the surface. The alkyl group attached to the silicon can contain a functional group which can act as a bonding site for polymer to silica (*Langmuir* 1993, 3513–17).

It is also known that cleavage of $(alkyl)_4Sn$ compounds by surface hydroxyls can lead to bonding of tin and residual hydrocarbon (polymer) substituents to the surface and hydrocarbon formation (*J. Amer. Chem. Soc.* 1993, 113, 722–9). This reaction should result in the cleavage of a tin coupled polymer to lower molecular weight fragments. Carbon-silicon bonds are not cleaved by this process under similar reaction conditions.

Silanes have been used to bond polymers to silica in polymer composites, while tin compounds have not been reported to have been so used.

SUMMARY OF INVENTION

It is therefore an object of the present invention to provide anionic polymerization terminators which improve the interaction of diene polymer elastomers with silica filler surfaces.

It is another object of the present invention to provide a method for reducing the hysteresis of silica-filled elastomeric vulcanizable compounds.

It is another object of the present invention to provide a method for reducing the viscosity of silica-filled elastomeric vulcanizable compounds.

It is another object of the present invention to provide a method for enhancing the processability of silica-filled elastomeric vulcanizable compounds.

It is another object of the present invention to provide vulcanizable silica-filled elastomeric compounds which, upon vulcanization, exhibit reduced hysteresis.

It is still another object of the present invention to provide an improved pneumatic tire having decreased rolling resistance.

The foregoing objects, together with the advantages thereof over the existing art, which shall become apparent from the specification which follows, are accomplished by the invention as hereinafter described and claimed.

The present invention provides a process for the production of a diene-based elastomeric composition exhibiting reduced hysteresis properties when compounded with silica filler and vulcanized, the process comprising: mixing diene monomer and optionally monovinyl aromatic monomer or a triene with an initiator, and a coordinator; effecting polymerization conditions; terminating polymerization with an organo-tin terminator to form a tin-coupled diene elastomer; compounding the tin-coupled diene elastomer with an amorphous silica filler, and a vulcanization agent; and, effecting vulcanization of the silica-filled, tin-coupled diene elastomer composition.

The present invention further provides a vulcanizable silica-filled compound comprising a diene elastomer containing an organo-tin functionality derived from a terminator selected from the group consisting of tin tetrachloride, $(R_1)_2SnCl_2$, $R_1SnCl_3$, $(R_1)_2Sn(OR_1)_2$, $R_1Sn(OR_1)_3$, $Sn(OR_1)_4$, dialkyldioxastannylanes of the formula

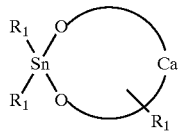

wherein a is 2 or 3, and mixtures thereof, wherein each $R_1$ is independently C1 to about C8 aliphatic, about C6 to about C12 cyclo-aliphatic, or about C6 to about C18 aromatic, a silica filler, and a vulcanization agent. Optionally, the elastomer is a copolymer of at least one diene and at least one monovinyl aromatic monomer, and may contain a carbon black filler. The compound is more readily processable due to cleavage of tin-carbon bonds during mixing.

The present invention provides a pneumatic tire having tread stock vulcanized from the inventive vulcanizable silica-filled compound, having decreased rolling resistance.

BRIEF DESCRIPTION OF THE DRAWINGS

FIG. 1 is a graph which plots compound Mooney Viscosity ($ML_4$) at 100° C. versus gum Mooney Viscosity; and FIG. 2 is a graph which plots minimum torque (ML) versus gum Mooney Viscosity ($ML_4$).

DETAILED DESCRIPTION OF THE PREFERRED EMBODIMENTS

In general, the present invention provides a means to enhance interaction of elastomeric polymers with silica filler to reduce hysteresis, namely the use of organotin modifiers for organolithium polymerization terminators. The present invention further provides a means to cleave tin coupled polymer chains in silica- and mixed carbon black/silica-filled formulations so that compound viscosity is reduced for better processing.

According to the present invention, an organolithium initiator, preferably an alkyllithium initiator is employed to prepare a narrow molecular weight distribution, anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, ρ-methylstyrene, vinyltoluenes and vinylnaphtalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene and copolymers such as styrene butadiene rubber (SBR). Copolymers can comprise from about 99 to 55 percent by weight of diene units and from about 1 to about 45 percent by weight of monovinyl aromatic or triene units, totalling 100 percent. The polymers and copolymers of the present invention may have the diene portion with a 1,2-microstructure contents ranging from about 10 to about 80 percent, with the preferred polymers or copolymers having 1,2-microstructure contents of from about 25 to about 65 percent. The molecular weight of the polymer that is produced according to the present invention, is preferably such that a proton-quenched sample will exhibit a gum Mooney viscosity ($ML_4/212°$ F.) of from about 2 to about 150. The copolymers are preferably random copolymers which result from simultaneous copolymerization of the monomers, as is known in the art.

The initiators used in the present invention include organolithium compounds such as n-butyllithium, tributyltin lithium, as well as lithium imide compounds wherein the lithium atom is directly bonded to the nitrogen of a secondary amine or (lithium-hydrocarbyl) substituted amine wherein the lithium atom is directly bonded to a carbon which is part of a hydrocarbyl group which, in turn, is bonded to a nitrogen. Representative of the former (i.e., lithium bonded to nitrogen) are aminolithium compounds of the structural formula $R'_2N$—Li, and of the latter (i.e., lithium bonded to a carbon), compounds of the structural formula $R'_2N$—$R'$—Li, wherein each R' in either formula ia a monovalent hydrocarbyl group, preferably having 1 to 12 carbons and more preferably having 1 to 4 carbon atoms, and R" is a divalent hydrocarbyl group, preferably having 2 to 20 carbons. More particularly, the R' in either of the formulas may be a $C_{1-12}$ hydrocarbyl group, such as, for instance, a $C_{1-12}$ alkyl group. In the latter formulas, it will be appreciated that the lithium atom is preferably not bonded to a carbon which is directly bonded to the amine nitrogen, but rather, is separated by at lest one, and more preferably, at least 3 carbon atoms. Further examples of these compounds include the dialkylaminolithium compounds such as dimethylaminolithium, diethylaminolithium, dipropylaminolithium, dibutylaminolithium and the like, dialkylaminoalkyllithium compounds such as diethylaminopropyllithium and the like, and trialkyl stanyl lithium, wherein the alkyl group contains 1 to about 12 carbon atoms, preferably 1 to about 4 carbon atoms.

Polymerization is usually conducted in a conventional solvent for anionic polymerizations such as the various cyclic and acyclic hexanes, heptanes, octanes, pentanes, their alkylated derivatives, and mixtures thereof, as well as aromatic solvents such as benzene, t-butylbenzene, toluene and the like. Other techniques for polymerization, such as semi-batch and continuous polymerization may be employed. In order to promote randomization in copolymerization and to increase vinyl content, a coordinator may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator employed.

Compounds useful as coordinators are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2-2'-di(tetrahydrofuryl) propane, di-piperidyl ethane, hexamethylphosphoramide, N-N '-dimethylpiperazine,diazabicyclooctane, diethyl ether, tributylamine and the like. Details of linear and cyclic oligomeric oxolanyl coordinators can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the coordinator and the initiator. Alternatively, the monomer and coordinator can be added to the initiator. The procedure is carried out under anhydrous, anaerobic conditions. The reactants are heated to a temperature of from about 10° to about 150° C. and are agitated for about 0.1 to 24 hours. After polymerization is complete, the product is removed from the heat and terminated in one or more ways.

To terminate the polymerization, the terminating agents according to the present invention are employed, also known as coupling agents or linking agents, all of these agents being collectively referred to herein as "terminating agents".

Terminating agents may provide the resulting polymer with a multifunctionality. That is, the polymers initiated according to the present invention, may carry at least one amine functional group and may also carry a second functional group selected and derived from the group consisting of terminating agents, coupling agents and linking agents.

Examples of terminating agents according to the present invention include tin tetrachloride, $(R_1)_2SnCl_2$, $R_1SnCl_3$, $(R_1)_2Sn(OR_1)_2$, $R_1Sn(OR_1)_3$, $Sn(OR_1)_4$, and dialkyldioxastannylanes of the formula

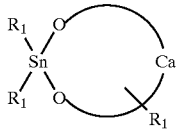

and the like, wherein a is 2 or 3, and wherein $R_1$ is C1 to about C18 aliphatic, about C6 to about C12 cyclo-aliphatic, or about C6 to about C18 aromatic, preferably C1 to about C10 aliphatic, about C6 to about C10 cycloaliphatic, or about C6 to about C12 aromatic.

The terminating agent is added to the reaction vessel, and the vessel is agitated for about 1 to about 1000 minutes. As a result, an elastomer is produced having an even greater affinity for silica compounding materials, and hence, even further reduced hysteresis.

Quenching is usually conducted by stirring the polymer and quenching agent for about 0.05 to about 2 hours at temperatures of from about 30° to 120° C. to ensure complete reaction. Polymers terminated with a functional group as discussed a hereinabove, are subsequently quenched with alcohol or other quenching agent as described hereinabove.

Lastly, the solvent is removed from the polymer by conventional techniques such as drum drying, extruder drying, vacuum drying or the like, which may be combined with coagulation with water, alcohol or steam, thermal desolventization, or any other suitable method. If coagulation with water or steam is used, oven drying may be desirable.

The polymers of the present invention contain a functional group at both the head of the polymer chain and at the terminal end of the chain. These functional groups have an affinity for silica.

Sn—O—Si coupling of the elastomer to the silica filler according to the present invention is the result of cleavage of carbon-Sn bonds on mixing, with subsequent reduction of the compound viscosity allowing for better processing and mixing.

Such compounding further results in products exhibiting reduced hysteresis, which means a product having increased rebound, decreased rolling resistance and has lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires.

The polymers of the present invention can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely with a range comprising about 10 to about 99 percent by weight of the total rubber. It is to be appreciated that the minimum amount will depend primarily upon the degree of reduced hysteresis that is desired.

According to the present invention, amorphous silica (silicon dioxide) is utilized as a filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts per 100 parts of polymer (phr), preferably in an amount from about 5 to about 80 phr. The useful upper range is limited by the high viscosity imparted by fillers of this type. Some of the commercially available silicas which may be used include: Hi-Sil® 190, Hi Sil® 215, Hi-Sil®

233, produced by PPG Industries. Also, a number of useful commercial grades of different silicas are available from DeGussa Corporation, Rhone Poulenc, and J. M. Huber Corporation.

The polymers can also be compounded with all forms of carbon black in amounts ranging from about 0 to about 50 parts by weight, per 100 pants of rubber, (phr), with less than about 10 phr being preferred. The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in TABLE I hereinbelow.

TABLE I

Carbon Blacks

| ASTM Designation (D-1765-82a) | Surface Area ($m^2$/g) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred.

The reinforced rubber compounds can be cured in a conventional manner with known vulcanizing agents at about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the functionalized polymers herein with carbon black, silica, and other conventional rubber additives including for example, fillers, plasticizers, antioxidants, curing agents and the like using standard rubber mixing equipment and procedures. Such elastomeric compositions when vulcanized using conventional rubber vulcanization conditions have reduced hysteresis properties and are particularly adapted for use as tread rubbers for tires having reduced rolling resistance.

General Experimental

EXAMPLE NOS. 1–10 AND COMPARATIVE EXAMPLES A–G

In order to demonstrate the preparation and properties of elastomeric compositions prepared according to the present invention, styrene butadiene polymers were prepared with n-BuLi modified initiation and coupled with R(n)SnX(4−n) or R(n)SiX(4−n) where n is an integer 0, 1 or 2, or mixtures thereof. The molar ratio of coupling agent to active lithium and the properties of the polymers prepared are shown below in Table II. Coupling of narrow distribution polymers prepared by alkyllithium initiation aids in the isolation and drying of the polymer by conventional rubber drying equipment through increasing the molecular weight and molecular weight distribution and reducing polymer stickiness and cold flow. As noted above, various techniques known in the art for carrying out polymerizations may be used with these terminators without departing from the scope of the present invention.

In the Tables, "C" used in conjunction with the example number denotes "Control" or the measurements taken before termination, while "T" used in conjunction with the example number denotes the measurements taken after termination.

TABLE II

| Ex. No | Molar Raio Terminator/Li | Terminator | $ML_4$ | $M_m$ | $M_w/M_m$ | % Coupling | % Styrene | % Blk Styrene | % 1, 2 (Bd = 100) | DSV | $T_g$ (−° C.) |
|---|---|---|---|---|---|---|---|---|---|---|---|
| 1C |  |  | 10.4 | 107000 | 1.04 | 2.3 | 27.5 | 5.4 | 54.0 | 0.97 | 33.2 |
| 1T | 1:1 | Sn (—O-t-Butyl)$_4$ | 66.8 | 251000 | 1.27 | 81.0 | 27.5 | 5.5 | 53.9 | 1.85 | 33.6 |
| 2C |  |  | 9.9 | 110000 | 1.04 | 2.5 | 27.5 | 4.4 | 48.7 | 0.96 | 37.0 |
| 2T | 0.25:1 | SnCl$_4$ | 77.8 | 262000 | 1.26 | 84.1 | 28.6 | 4.7 | 48.6 | 1.87 | 37.4 |
| 3C |  |  | 8.3 | 97000 | 1.04 | 2.2 | 27.3 | 4.4 | 53.5 | 0.94 | 34.4 |
| 3T | 1:1 | SnCl$_4$ | 38.8 | 139000 | 1.61 | 43.0 | 27.5 | 5.1 | 53.2 | 1.30 | 34.9 |
| Comp AC |  |  | 12.0 | 118000 | 1.03 | 1.7 | 27.5 | 5.4 | 54.2 | 1.01 | 32.5 |
| Comp AT | 0.25:1 | SiCl$_4$ | 76.6 | 273000 | 1.30 | 68.5 | 28.8 | 5.2 | 52.9 | 1.84 | 33.4 |
| Comp BC |  |  | 10.2 | 105000 | 1.05 | 2.3 | 26.2 | 4.3 | 53.7 | 0.98 | 35.0 |
| Comp BT | 1:1 | SiCl$_4$ | 90.1 | 311000 | 1.15 | 95.4 | 26.3 | 4.1 | 51.8 | 2.04 | 36.4 |
| 4C |  |  | 11.1 | 115000 | 1.03 | 1.2 | 27.7 | 5.8 | 54.5 | 1.02 | 34.3 |
| 4T | 1:1 | BuSn (—O-t-Amyl)$_3$ | 81.2 | 226000 | 1.21 | 76.8 | 27.5 | 5.2 | 53.4 | 1.71 | 34.5 |
| 5C |  |  | 7.8 |  | 1.05 | 2.9 | 27.1 | 4.5 | 53.0 | 0.93 | 35.0 |
| 5T | 0.33:1 | BuSnCl$_3$ | 81.6 | 233000 | 1.11 | 95 | 28.5 | 5.4 | 52.7 | 1.73 | 34.1 |
| 6C |  |  | 12.7 | 114000 | 1.04 | 2.8 | 26.8 | 4.9 | 53.2 | 1.05 | 35.5 |

TABLE II-continued

| Ex. No | Molar Raio Terminator/Li | Terminator | $ML_4$ | $M_m$ | $M_w/M_m$ | % Coupling | % Styrene | % Blk Styrene | % 1, 2 (Bd = 100) | DSV | $T_g$ (-° C.) |
|---|---|---|---|---|---|---|---|---|---|---|---|
| 6T | 1:1 | $BuSnCl_3$ | 75.0 | 232000 | 1.19 | 81.3 | 26.9 | 4.5 | 52.3 | 1.71 | 35.7 |
| Comp CC | | | 8.0 | 102000 | 1.04 | | 26.0 | 4.7 | 52.7 | 0.95 | 36.1 |
| Comp CT | 0.33:1 | $CH_3SiCl_3$ | 85.0 | 258000 | 1.08 | 91.2 | 27.3 | 5.1 | 52.1 | 1.74 | 35.2 |
| Comp DC | | | 19.1 | 131000 | 1.05 | | 27.0 | 5.3 | 55.8 | 1.12 | 33.2 |
| Comp DT | 1:1 | $CH_3SiCl_3$ | 103.7 | 294000 | 1.12 | 91.3 | 27.2 | 5.3 | 55.5 | 2.07 | 33.1 |
| 7C | | | 9.0 | 111000 | 1.04 | 2.1 | 27.0 | 5.4 | 53.5 | 0.99 | 32.7 |
| 7T | 1:1 | $Bu_2Sn$ (—O-t-Amyl)$_2$ | 55.5 | 173000 | 1.13 | 69.2 | 27.2 | 5.2 | 53.6 | 1.46 | 34.4 |
| 8C | | | 31.8 | 152000 | 1.04 | 2.4 | 28.7 | 6.7 | 58.7 | 1.24 | 28.2 |
| 8T | 1:1 | Dioxastannaiane | 104.4 | 265000 | 1.09 | 84.6 | 28.7 | 6.7 | 58.1 | 1.99 | 28.8 |
| 9C | | | 9.4 | 105000 | 1.04 | 2.5 | 27.1 | 5.0 | 52.7 | 0.97 | 36.0 |
| 9T | 0.5:1 | $Bu_2SnCl_2$ | 77.4 | 206000 | 1.06 | 95 | 28.8 | 5.0 | 50.5 | 1.60 | 35.6 |
| 10C | | | 9.1 | 107000 | 1.04 | 2.3 | 26.5 | 4.1 | 51.4 | 0.98 | 36.7 |
| 10T | 1:1 | $Bu_2SnCl_2$ | 68.0 | 202000 | 1.04 | 95.9 | 26.9 | 4.6 | 50.5 | 1.57 | 36.4 |
| Comp EC | | | 11.0 | 112000 | 1.03 | | 26.6 | 4.6 | 53.2 | 1.02 | 35.6 |
| Comp ET | 0.5:1 | $(CH_3)_2SiCl_2$ | 64.9 | 188000 | 1.11 | 72.0 | 27.4 | 4.8 | 52.0 | 1.54 | 34.3 |
| Comp FC | | | 11.9 | 116000 | 1.04 | | 26.7 | 4.4 | 52.0 | 1.05 | 35.3 |
| Comp FT | 1:1 | $(CH_3)_2SiCl_2$ | 82.6 | 210000 | 1.08 | 87.2 | 27.3 | 4.9 | 51.9 | 1.64 | 34.8 |
| CompGC | | No Terminator | 42.5 | 163000 | 1.07 | 2.7 | 26.1 | 3.8 | 48.2 | 1.44 | 39.5 |

Dioxastannaiane = $Bu_2Sn(—O—CH(ET)CH(ME)CH_2—O—)$

EXAMPLE NOS. 11–20, AND COMPARATIVE EXAMPLES H–N

The polymers prepared above were compounded in the following high silica formulation with a control polymer coupled with methyltriphenoxysilane.

TABLE III

| Silica Formulations | |
|---|---|
| Ingredient | Amount (parts per 100 parts polymer) |
| Polymer | 100 |
| Silica | 40 |
| Carbon Black | 8 |
| Si-69 | 1 |
| DCHA | 1 |
| Stearic Acid | 2 |
| Sulfur | 1.4 |

TABLE III-continued

| Silica Formulations | |
|---|---|
| Ingredient | Amount (parts per 100 parts polymer) |
| Accelerators | 2.4 |
| Zinc Oxide | 3 |
| Total | 159.8 |

Si-69 and DCHA are Processing Aids

The compound and cured properties for these high silica formulations of the tin and silicon-coupled polymer compositions are presented in Tables IV and V, respectively.

TABLE IV

| Example | Control* | 11C | 11T | 12C | 12T | 13C | 13T | 14C | 14T | 15C | 15T |
|---|---|---|---|---|---|---|---|---|---|---|---|
| Polymer from Ex. | ** | 1C | 1T | 2C | 2T | 3C | 3T | 4C | 4T | 5C | 5T |
| Gum $ML_4$ | 42.0 | 10.4 | 66.8 | 9.9 | 77.8 | 8.3 | 38.8 | 11.1 | 81.2 | 7.8 | 81.6 |
| Mixing (70 rpm) Time (min) | 8:00 | 9:00 | 2:35 | 9:00 | 3:20 | 10:00 | 8:30 | 9:00 | 3:45 | 9:00 | 3:25 |
| Cpd $ML_4$ 100° C. | 96.4 | 42.7 | 96.6 | 45.7 | 103.9 | 37.1 | 66 | 51.1 | 100 | 37.2 | 110.3 |
| ML | 7.6 | 2.7 | 8.09 | 3.22 | 8.95 | 2.83 | 4.37 | 2.94 | 8.39 | 2.59 | 9.70 |
| MH | 40.27 | 43.11 | 49.11 | 38.01 | 44.2 | 43.0 | 41.71 | 42.62 | 47.67 | 42.33 | 47.18 |
| Shore A | 64 | 73 | 74 | 70 | 70 | 74 | 69 | 72 | 69 | 72 | 68 |
| Pendulum Rebound 65° C. | 71.2 | 55.8 | 61.0 | 59.6 | 65.4 | 59.4 | 69.2 | 58.8 | 63.2 | 56.8 | 65.2 |
| Ring Tensile @ 24° C. | | | | | | | | | | | |
| 100% Mod (psi) | 542 | 586 | 537 | 467 | 444 | 490 | 567 | 565 | 564 | 573 | 497 |
| Max Stress (psi) | 1946 | 1857 | 1890 | 1600 | 1989 | 1519 | 2435 | 1979 | 2012 | 1891 | 2321 |
| Max Strain (%) | 260 | 299.7 | 294.8 | 326.5 | 355.8 | 294.8 | 330.2 | 319.8 | 287.4 | 314.3 | 354 |
| Ring Tensile @ 100° C. | | | | | | | | | | | |
| 100% Mod (psi) | 467 | 418 | 403 | 351 | 356 | 424 | 423 | 409 | 433 | 447 | 434 |
| Max Stress (psi) | 1116 | 1065 | 1203 | 1150 | 1258 | 1037 | 1266 | 970 | 1207 | 1080 | 1410 |
| Max Strain (%) | 187.4 | 230.1 | 252 | 294.8 | 293.5 | 228.9 | 238 | 214.2 | 230.7 | 231.9 | 265.5 |

TABLE IV-continued

| | | | | | | | | | | | |
|---|---|---|---|---|---|---|---|---|---|---|---|
| Ring Tear 171° C. (lb/in) | 82 | 130 | 189 | 225 | 236 | 208 | 229 | 126 | 136 | 205 | 200 |
| 65° C. Tanδ (7%) | 0.0690 | 0.1544 | 0.1332 | 0.1827 | 0.1425 | 0.1804 | 0.1040 | 0.1482 | 0.1183 | 0.1757 | 0.1341 |
| 65° C. G' (dynes/sq cm × $10^{-7}$) | 2.5103 | 6.8237 | 6.2568 | 4.6614 | 4.7899 | 6.4380 | 2.9845 | 5.6181 | 5.6024 | 7.6755 | 4.7822 |
| 65° C. ΔG' (dynes/sq cm × $10^{-7}$) | 0.4173 | 3.9148 | 3.2356 | 2.4610 | 2.1762 | 3.7863 | 0.8863 | 2.9627 | 2.6276 | 4.5172 | 2.2409 |
| Wet Skid | 44 | 46 | 45 | 45 | 45 | 48 | 47 | 47 | 46 | 46 | 47 |

| Example | 16C | 16T | 17C | 17T | 18C | 18T | 19C | 19T | 20C | 20T | H |
|---|---|---|---|---|---|---|---|---|---|---|---|
| Polymer from Ex. | 6C | 6T | 7C | 7T | 8C | 8T | 9C | 9T | 10C | 10T | GC |
| Gum $ML_4$ | 12.7 | 75 | 9.0 | 55.5 | 32.9 | 104.7 | 9.4 | 77.4 | 9.1 | 68.0 | 42.5 |
| Mixing (70 rpm) Time (min) | 8:00 | 4:00 | 9:00 | 3:20 | 4:50 | 3:55 | 9:00 | 4:15 | 8:00 | 4:00 | 5:00 |
| Cpd $ML_4$ 100° C. | 55.3 | 107.2 | 46.3 | 96.9 | 89.5 | 140 | 42.6 | 114 | 43.6 | 111.6 | 110.5 |
| ML | 3.36 | 9.41 | 3.04 | 6.92 | 5.93 | 12.16 | 2.88 | 8.25 | 2.40 | 7.49 | 8.30 |
| MH | 44.49 | 46.55 | 43.46 | 48.80 | 48.41 | 50.27 | 43.19 | 47.27 | 43.24 | 47.42 | 48.28 |
| Shore A | 74 | 70 | 73 | 73 | 76 | 72 | 74 | 72 | 74 | 73 | 72 |
| Pendulum Rebound 65° C. | 58.8 | 65 | 58 | 63.4 | 57.4 | 64 | 59.2 | 66 | 58.4 | 65 | 67.8 |
| Ring Tensile @ 24° C. | | | | | | | | | | | |
| 100% Mod (psi) | 571 | 553 | 559 | 581 | 678 | 537 | 601 | 541 | 590 | 595 | 501 |
| Max Stress (psi) | 1839 | 2291 | 1883 | 1982 | 2362 | 2227 | 2105 | 2241 | 1667 | 2025 | 2146 |
| Max Strain (%) | 314.3 | 321.6 | 317.3 | 291.1 | 302.7 | 306.4 | 328.3 | 327.1 | 285.6 | 303.9 | 346 |
| Ring Tensile @ 100° C. | | | | | | | | | | | |
| 100% Mod (psi) | 469 | 428 | 413 | 442 | 486 | 409 | 491 | 466 | 493 | 486 | 464 |
| Max Stress (psi) | 988 | 1143 | 978 | 1062 | 1158 | 1096 | 1038 | 1299 | 825 | 967 | 1319 |
| Max Strain (%) | 212.4 | 228.9 | 218.5 | 209.9 | 208.1 | 215.4 | 200.2 | 234.4 | 175.2 | 192.2 | 250.2 |
| Ring Tear 171° C. (lb/in) | 154 | 157 | 142 | 140 | 128 | 113 | 206 | 191 | 153 | 134 | 176 |
| 65° C. Tanδ (7%) | 0.1396 | 0.1036 | 0.1475 | 0.1219 | 0.1447 | 0.1099 | 0.158 | 0.124 | 0.1427 | 0.1087 | 0.1177 |
| 65° C. G' (dynes/sq cm × $10^{-7}$) | 9.9941 | 4.8918 | 6.235 | 6.3746 | 7.1809 | 5.9496 | 6.1124 | 5.4797 | 6.7624 | 5.7533 | 5.5921 |
| 65° C. ΔG' (dynes/sq cm × $10^{-7}$) | 6.8434 | 1.9762 | 3.4199 | 3.2375 | 4.0888 | 2.8411 | 3.2406 | 2.5985 | 3.7138 | 2.5195 | 2.6384 |
| Wet Skid | 44 | 45 | 47 | 46 | 47 | 46 | 47 | 46 | 44 | 44 | 46 |

*Additive = $MeSi(OPh)_3$
**Terminated with (–OPh)Si

TABLE V

| Example | Control | I-C | I-T | J-C | J-T | K-C | K-T | H | L-C | L-C |
|---|---|---|---|---|---|---|---|---|---|---|
| Polymer from Ex. | | | | | | | | | D-C | D-T |
| Gum $ML_4$ | 42.0 | 12.0 | 76.7 | 10.2 | 90.1 | 8.0 | 85.2 | 42.5 | 19:1 | 103.7 |
| Mixing (70 rpm) Time (min) | 8:00 | 9:00 | 3:00 | 10:00 | 4:00 | 9:00 | 2:35 | 5:00 | 7:00 | 2:35 |
| Cpd $ML_4$ 100° C. | 96.4 | 52.6 | 143.2 | 45.5 | 153.2 | 40.5 | 138.8 | 110.5 | 70.8 | 155.9 |
| ML | 7.6 | 3.12 | 18.14 | 3.31 | 22.6 | 2.93 | 21.07 | 8.30 | 4.75 | 21.79 |
| MH | 40.27 | 38.25 | 48:28 | 42.95 | 49.67 | 42.91 | 52.79 | 48.28 | 44.92 | 52.07 |
| Shore A | 64 | 71 | 74 | 70 | 73 | 73 | 74 | 72 | 68 | 72 |
| Pend. Rebound 65° C. | 71.2 | 60.5 | 65.6 | 61.8 | 72 | 59.8 | 66.8 | 67.8 | 64 | 68.2 |
| Ring Tensile @24° C. | | | | | | | | | | |
| 100% Mod (psi) | 542 | 492 | 482 | 540 | 596 | 552 | 571 | 501 | 512 | 515 |
| Max Stress (psi) | 1946 | 1828 | 1981 | 1925 | 2513 | 1881 | 2406 | 2146 | 2064 | 2431 |
| Max Strain (%) | 260 | 336.3 | 318.0 | 321.6 | 289.9 | 318 | 329.6 | 346.0 | 339.3 | 332.6 |
| Ring Tensile @100° C. | | | | | | | | | | |
| 100% Mod (psi) | 467 | 340 | 442 | 475 | 544 | 437 | 494 | 464 | 449 | 466 |
| Max Stress (psi) | 1116 | 1046 | 1371 | 1084 | 1773 | 874 | 1303 | 1319 | 1073 | 1370 |
| Max Strain (%) | 187 | 268 | 260 | 213 | 241 | 193 | 228 | 250 | 210 | 237 |
| Ring Tear 171° C. lb/in | 82 | 242 | 218 | 200 | 117 | 215 | 152 | 176 | 189 | 148 |
| 65° C. Tanδ (7%) | 0.0690 | 0.1622 | 0.1439 | 0.1582 | 0.1084 | 0.1748 | 0.1389 | 0.1177 | 0.1529 | 0.1270 |

TABLE V-continued

| | | | | | | | | | | |
|---|---|---|---|---|---|---|---|---|---|---|
| 65° C. G' (dynes/sq cm × 10⁻⁷) | 2.5103 | 4.972 | 6.4684 | 5.9731 | 5.5394 | 6.3189 | 7.0029 | 5.5921 | 5.303 | 7.2911 |
| 65° C. ΔG' (dynes/sq cm × 10⁻⁷) | 0.4173 | 2.5448 | 3.4362 | 3.3037 | 2.4024 | 3.6587 | 3.7746 | 2.6384 | 2.8111 | 3.8403 |
| Wet Skid | 44 | 47 | 47 | 48 | 47 | 47 | 45 | 46 | 47 | 47 |

| Example | M-C | M-T | N-C | N-T | H |
|---|---|---|---|---|---|
| Polymer from Ex. | E-C | E-T | F-C | F-T | G |
| Gum ML$_4$ | 11.0 | 64.9 | 11.9 | 82.6 | 42.5 |
| Mixing (70 rpm) Time (min) | 9:00 | 4:00 | 9:00 | 4:00 | 5:00 |
| Cpd ML$_4$ 100° C. | 54.2 | 134.8 | 56.3 | 138.5 | 110.5 |
| ML | 3.41 | 10.89 | 3.46 | 13.44 | 8.30 |
| MH | 42.76 | 48.95 | 42.04 | 50.10 | 48.28 |
| Shore A | 73 | 74 | 73 | 70 | 72 |
| Pend. Rebound 65° C. | 59 | 63.6 | 59.6 | 65.2 | 67.8 |
| Ring Tensile @24° C. | | | | | |
| 100% Mod (psi) | 525 | 545 | 534 | 506 | 501 |
| Max Stress (psi) | 1947 | 2460 | 1962 | 2289 | 2146 |
| Max Strain (%) | 333.2 | 360.1 | 329.6 | 35 | 346.0 |
| Ring Tensile @100° C. | | | | | |
| 100% Mod (psi) | 472 | 507 | 489 | 481 | 464 |
| Max Stress (psi) | 1141 | 1641 | 1238 | 1286 | 1319 |
| Max Strain (%) | 228 | 274 | 236 | 228 | 250 |
| Ring Tear 171° C. lb/in | 191 | 137 | 175 | 127 | 176 |
| 65° C. Tanδ (7%) | 0.1437 | 0.1212 | 0.1300 | 0.122 | 0.1177 |
| 65° C. G' (dynes/sq cm × 10⁻⁷) | 5.7372 | 6.3407 | 5.1064 | 6.9139 | 5.5921 |
| 65° C. ΔG' (dynes/sq cm × 10⁻⁷) | 2.9548 | 3.2143 | 2.3348 | 3.6410 | 2.6384 |
| Wet Skid | 47 | 45 | 46 | 47 | 46 |

Additive = MeSi(OPh)$_3$

As demonstrated by the plot of compound Mooney viscosity (ML$_4$) at 100° C. versus gum ML$_4$, all of the tin coupled polymers, regardless of the stoichiometry or the nature of X, have lower compound ML$_4$s than their silicon-coupled analogues or that would be predicted by the general trend, shown in FIG. 1. Similarly, the minimum torque (ML), as measured by Monsanto Rheometer, is lower for the tin compound coupling compared to silicon coupling, FIG. 2.

Both the ML$_4$ and ML values of the tin coupled polymers, which are lower than expected for the gum ML$_4$s of the raw polymers, indicate polymers that are more easily processable in rubber mixing and extruding equipment than the silicon-coupled counterparts.

Despite the apparent cleavage of the tin coupled polymers on mixing in the above high silica formulation, the tensile and dynamic properties of these materials are not significantly affected when compared to the uncleaved silicon-coupled polymers, reported in Tables IV (tin-coupled) and V (silicon-coupled).

EXAMPLE NOS. 21–34 AND COMPARATIVE EXAMPLES O–R

The coupled elastomeric polymers prepared above were also compounded in a 50/50 carbon black/silica formulation as described below, with or without the processing aids (PA) dicyclohexylamine and Si-69.

TABLE VI

Screening Formulation with 50CB/50 Silica

| Ingredient | Amount (with Processing Aids) | Amount (without Processing Aids) |
|---|---|---|
| Polymer | 100 | 100 |
| Silica | 23.4 | 23.4 |
| Carbon Black | 23.4 | 23.4 |
| Si-69 | 0.5 | 0 |
| DCHA | 0.5 | 0 |
| Antioxidant | 1 | 1 |
| Stearic Acid | 2 | 2 |
| Sulfur | 1.4 | 1.4 |
| Accelerators | 2.4 | 2.4 |
| Zinc Oxide | 3 | 3 |
| Total | 157.6 | 156.6 |

Si69 and DCHA=Process Aids

The filler was added in portions with either the carbon black or silica first. The first group of six tin-coupled polymers was mixed with the Carbon Black portion of the filler first, and the second group of tin-coupled polymers were mixed with the silica first. The third group of polymers, the silicon-coupled control polymers, were mixed only with the carbon black first. Two mixes were prepared with each polymer in each group. The first mix in each case contained the processing aids (PA) as described above. Test data from these samples are presented in Table VII.

TABLE VII

| Example | 21 | 22 | 23 | 24 | 25 | 26 |
|---|---|---|---|---|---|---|
| | Carbon Black mixed first | | | | | |
| Polymer from Ex. | 2T | 2T | 5T | 5T | 9T | 9T |
| Processing Aid | PA | No | PA | No | PA | No |
| ML | 4.27 | 5.57 | 4.70 | 6.19 | 4.27 | 4.99 |
| MH | 40.12 | 41.18 | 40.31 | 42.14 | 40.31 | 41.47 |
| Ring Tensile @ 24° C. | | | | | | |
| 100% Mod (psi) | 397 | 452 | 473 | 378 | 544 | 385 |
| Max Stress (psi) | 1699 | 1551 | 1527 | 1283 | 1848 | 1203 |
| Max Strain (%) | 305 | 302 | 246 | 288 | 270 | 271 |
| Ring Tensile @ 100° C. | | | | | | |
| 100% Mod (psi) | 388 | 322 | 365 | 285 | 330 | 298 |
| Max Stress (psi) | 878 | 896 | 832 | 882 | 864 | 842 |
| Max Strain (%) | 195 | 255 | 190 | 261 | 209 | 245 |
| 65° C. Tan$\delta$ (7%) | 0.0896 | 0.1080 | 0.0918 | 0.1166 | 0.0937 | 0.1130 |
| 65° C. G' (dynes/sq cm × $10^{-7}$) | 2.8663 | 3.5918 | 2.9081 | 4.2332 | 2.973 | 3.7034 |
| 65° C. $\Delta$G' (dynes/sq cm × $10^{-7}$) | 0.6638 | 1.1552 | 0.7146 | 1.6425 | 0.8210 | 1.3596 |

| Example | 27 | 28 | 29 | 30 | 31 | 32 |
|---|---|---|---|---|---|---|
| | Silica Filler mixed first | | | | | |
| Polymer from Ex. | 2T | 2T | 5T | 5T | 9T | 9T |
| Processing Aid | PA | No | PA | No | PA | No |
| ML | 4.08 | 4.66 | 4.61 | 5.38 | 4.42 | 5.33 |
| MH | 38.97 | 40.17 | 38.68 | 39.98 | 39.45 | 40.89 |
| Ring Tensile @ 24° C. | | | | | | |
| 100% Mod (psi) | 552 | 394 | 524 | 449 | 501 | 440 |
| Max Stress (psi) | 2198 | 1663 | 2141 | 1809 | 1724 | 1914 |
| Max Strain (%) | 307 | 334 | 303 | 320 | 267 | 321 |
| Ring Tensile @ 100° C. | | | | | | |
| 100% Mod (psi) | 379 | 296 | 371 | 292 | 405 | 160 |
| Max Stress (psi) | 1012 | 890 | 929 | 852 | 993 | 553 |
| Max Strain (%) | 212 | 261 | 201 | 246 | 202 | 272 |
| 65° C. Tan$\delta$ (7%) | 0.0914 | 0.1068 | 0.0861 | 0.1042 | 0.0802 | 0.0983 |
| 65° C. G' (dynes/sq cm × $10^{-7}$) | 2.5034 | 2.8631 | 2.5706 | 3.1576 | 2.5445 | 3.1999 |
| 65° C. $\Delta$G' (dynes/sq cm × $10^{-7}$) | 0.5319 | 0.7882 | 0.4841 | 0.9227 | 0.4398 | 0.9355 |

| Example | O | P | 33 | 34 | Q | R |
|---|---|---|---|---|---|---|
| | Carbon Black mixed first | | | | | |
| Polymer from Ex. | A-T | A-T | 10T | 10T | E-T | E-T |
| Processing Aid | PA | No | PA | No | PA | No |
| ML | 13.29 | 15.31 | 15.93 | 18.05 | 8.69 | 10.27 |
| MH | 43.67 | 44.78 | 44.63 | 45.11 | 44.23 | 44.35 |
| Ring Tensile @ 24° C. | | | | | | |
| 100% Mod (psi) | 517 | 428 | 496 | 378 | 529 | 382 |
| Max Stress (psi) | 1615 | 1440 | 1543 | 1396 | 1699 | 1343 |
| Max Strain (%) | 246 | 281 | 251 | 298 | 270 | 303 |
| Ring Tensile @ 100° C. | | | | | | |
| 100% Mod (psi) | 412 | 320 | 364 | 330 | 408 | 307 |
| Max Stress (psi) | 790 | 898 | 722 | 715 | 964 | 714 |
| Max Strain (%) | 167 | 239 | 177 | 203 | 212 | 217 |

| | | | | | | |
|---|---|---|---|---|---|---|
| 65° C. Tanδ (7%) | 0.1062 | 0.1227 | 0.1082 | 0.1167 | 0.0900 | 0.1225 |
| 65° C. G' (dynes/sq cm × 10⁻⁷) | 4.0933 | 4.8684 | 4.1319 | 4.6017 | 3.4593 | 4.9708 |
| 65° C. ΔG' (dynes/sq cm × 10⁻⁷) | 1.5395 | 2.2642 | 1.5178 | 2.0057 | 1.0515 | 2.4469 |

As demonstrated by the data in Table VII, tin-coupled polymers with gum $ML_4S$ and other properties essentially equivalent to the silicon coupled polymers give compounds with much lower ML's than the silicon-coupled polymers. At the same time, Tan δ's for the tin-coupled polymers are equivalent to or less than the silicon-coupled polymers, indicating equivalent or better hysteresis properties for the tin-coupled polymers. Tensile properties of the tin-coupled polymers are not adversely affected by the cleavage on mixing.

It is therefore demonstrated that the present invention provides a means to cause interaction of elastomeric polymers with silica filler to reduce hysteresis, and further provides a means to cleave tin coupled polymer chains in silica- and mixed carbon black/silica-filled formulations so that compound viscosity is reduced for better processing.

It should be appreciated that the present invention is not limited to the specific embodiments described above, but includes variations, modifications and equivalent embodiments defined by the following claims.

We claim:

1. A pneumatic tire comprising a silica-filled vulcanized compound that comprises a diene elastomer containing an organo-tin functionality derived from a terminator selected from the group consisting of tin tetrachloride, $(R_1)_2SnCl_2$, $R_1SnCl_3$, $(R_1)_2Sn(OR_1)_2$, $Sn(OR_1)_4$, dialkyldioxastannylanes of the formula

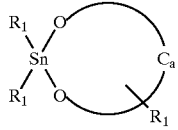

wherein a is 2 or 3, and mixtures thereof, wherein each $R_1$ is independently C1 to about C8 aliphatic, about C6 to about C12 cycloaliphatic, or about C6 to about C18 aromatic, a silica filler, and a vulcanization agent, wherein said silica-filled compound has a reduced viscosity compared to the viscosity of a control silica-filled compound comprising an equivalent diene elastomer containing an organo-silicon functionality derived from a silicon-based terminator.

2. The tire of claim 1, wherein the elastomer is selected from the group consisting of homopolymers of a conjugated diene monomer and copolymers comprising monomer units derived from a diene monomer and a monomer unit selected from the group consisting of monovinyl aromatic monomers and triene monomers.

3. The tire of claim 1, wherein each $R_1$ is independently $C_1$ to about $C_{10}$ aliphatic, about $C_6$ to about $C_{10}$ cycloaliphatic, or about $C_6$ to about $C_{12}$ aromatic.

4. The tire of claim 1, wherein the silica is present in an amount of about 1 phr to about 100 phr.

5. The tire of claim 4, wherein the silica is present in an amount of about 5 phr to about 80 phr.

6. The tire of claim 1, further comprising a carbon black filler.

7. The tire of claim 1, further comprising a natural rubber.

8. The tire of claim 1, wherein the tire comprising the diene elastomer containing an organo-tin functionality exhibits decreased rolling resistance compared to the rolling resistance of a similar tire comprising the equivalent diene elastomer containing an organo-silicon functionality.

* * * * *